United States Patent Office 3,506,393
Patented Apr. 14, 1970

3,506,393
PURIFICATION OF LITHIUM ALUMINATES
Charles K. Bon and Robert J. Moolenaar, Midland, Mich., assignors to The Dow Chemical Company, Midland, Mich., a corporation of Delaware
No Drawing. Continuation-in-part of application Ser. No. 619,594, Mar. 1, 1967. This application Sept. 26, 1968, Ser. No. 763,019
Int. Cl. C01f 7/04, 7/02; B07b 13/00
U.S. Cl. 23—52       1 Claim

ABSTRACT OF THE DISCLOSURE

A method for removing chlorine from chloride containing lithium aluminate complex compositions produced from chloride brines and other aqueous solutions which comprises contacting such compositions with water vapor at an elevated temperature sufficient to hydrolyze the chlorine to hydrogen chloride and thereby remove the chlorine contained therein.

Admixing a small amount of silica with the chloride containing lithium aluminate compositions results in optimum removal of chlorine.

---

This application is a continuation-in-part of Ser. No. 619,594, filed Mar. 1, 1967, now abandoned.

BACKGROUND OF THE INVENTION

This invention relates to a method for the purification of lithium aluminates and more particularly is concerned with a method for the removal of chloride impurities from lithium aluminate complex compositions obtained from aqueous chloride solutions.

The term "lithium aluminate complex composition" as used herein is meant to define a composition precipitated and recovered from an aqueous solution containing lithium and chloride values by admixing an aluminum compound with said solution and includes (a) lithium aluminate complexes which may contain various impurities chemically or physically bound, occluded or sorbed thereto, for example, lithium halo-aluminate complexes such as lithium chloroaluminate complexes, (b) other compounds which may be concomitantly precipitated with said complexes such as, for example, aluminum hydroxide and aluminum chlorohydroxides, and (c) residual portions of the reaction mixture.

The term "purified lithium aluminate composition" as used herein is meant to define a substantially chloride free composition obtained by removing chlorides from a "lithium aluminate complex composition" by the method of the present invention.

To meet the rapidly growing demand for lithium metal and lithium compounds several processes for the recovery of lithium values from natural brines and other aqueous solutions which contain relatively small amounts of soluble lithium salts have been developed. These have been found to be more economical than the previously known processes for the recovery of lithium from natural ores such as, for example, spodumene, lepidolite and amblygonite.

Among these solution recovery processes U.S. Patent 2,964,381 (Goodenough) discloses a process whereby over 90% of the lithium values can be recovered as lithium aluminate complex compositions from natural brines and other aqueous solutions containing very small amounts of dissolved lithium values and large quantities of other soluble compounds such as salts or other alkali metals and alkaline earth metals. To illustrate, lithium recoveries of from about 92% to about 97% are realized in this process from natural and concentrated calcium chloride brines, i.e. having a calcium chloride concentration within the range of about 18–40% by weight, containing 0.03–0.05% by weight lithium chloride and varying amounts of other impurities such as magnesium chloride, sodium chloride, and chlorides of other alkali metals and alkaline earth metals by admixing an aluminum compound with said brines under carefully controlled conditions of temperature and pH thereby to precipitate the lithium as a lithium aluminate complex, a 100–300% excess of said aluminum compound over the stoichiometric amount required to react with the lithium present being employed.

The structure of the lithium aluminate complex in compositions precipitated from aqueous chloride solutions by the practice of the patented Goodenough process is not completely known but appears to be a hydrated lithium aluminate complex containing lithium and aluminum in an atomic ratio of 1 Li:2–3.5 Al and which has associated therewith varying quantities of impurities, particularly chloride.

Since large tonnages of natural chloride brines containing relatively small amounts of lithium are available at very low cost, the recovery of lithium as a lithium aluminate complex from such chloride brines by the Goodenough process is economically very attractive.

The lithium aluminate complex compositions obtained from chloride brines by the Goodnough process, which normally contain associated therewith chlorine as well as alkali and alkaline earth metals and trace amounts of other impurities including, for example, bromine and iron, can be used for a number of applications. However, such compositions cannot be used directly as a source of lithium in the manufacture of glass and high strength ceramics, since substantially halogen-free raw materials are required for these uses. Other impurities in these compositions such as, for example, calcium, magnesium and sodium are not objectionable in such uses, particularly in the relatively small amounts in which they usually are present. Thus, lithium aluminate complex compositions recovered from chloride brines would be useful as an inexpensive source of lithium for glass manufacture and other uses if they were substantially free of chloride.

Several processes for the purification of and/or the recovery of lithium metal or lithium salts of relatively high purity from lithium aluminate complexes are well known and include, for example, the hydrothermal decomposition of such complexes and the subsequent recovery of lithium values by ion exchange. However, these processes are relatively expensive since several process steps are usually employed to produce lithium source materials of a purity not required for many uses.

There is need, therefore, for a simple, inexpensive process for producing substantially chloride-free lithium aluminate compositions from compositions containing chloride and various other impurities, particularly those lithium aluminate complex compositions recovered directly from chloride brines as hereinbefore described.

SUMMARY OF THE INVENTION

Now, unexpectedly, a method has been found whereby substantially chloride-free lithium aluminate complex compositions can readily be prepared from such compositions containing chlorine by contacting said compositions with water vapor at an elevated temperature sufficient to hydrolyze the chloride contained therein to hydrogen chloride, thereby removing said chloride from the resultant purified lithium aluminate compositions.

It has also been found, quite unexpectedly, that the removal of chloride from lithium aluminate complex compositions by the method of the present invention completely changes the structure of these compositions. X-ray diffraction analyses of chloride containing lithium aluminate complex compositions obtained from chloride brines by the Goodenough process and prior to the removal of chloride reveal no previously known crystalline structures. Analyses of the substantially chloride-free lithium aluminate compositions after treatment by the present novel method at temperatures of about 500° C. and above indicate the product is a lithium aluminuate composition containing the known crystalline structures corresponding to the formulae $LiAlO_2$ and $LiAl_5O_8$.

A principal object of the present invention is to provide a method for preparing substantially chloride-free lithium aluminate complex compositions.

It is another object to provide a simple, one-step process for the substantially complete removal of chlorine from chlorine containing lithium aluminate complex compositions precipitated and recovered from lithium containing chloride brines.

It is a further object to provide an inexpensive process whereby substantially chloride free lithium aluminate compositions useful in the manufacture of glass and high strength ceramics can be prepared from lithium aluminate complex compositions obtained from chloride brines.

Additional objects and advantages will become apparent from the following detailed description of the invention.

DESCRIPTION OF THE PREFERRED EMBODIMENTS

The present invention is directed principally to the removal of chlorides from lithium aluminate complex compositions precipitated and recovered from chloride brines. It is especially suitable for providing substantially chloride-free lithium aluminates from impure complex products obtained by practicing the method of Goodenough (U.S. Patent 2,964,381) described hereinbefore.

Lithium aluminate complex compositions obtained from halide brines by the Goodenough process are preferably water washed to remove residual brine associated therewith prior to the removal of chloride from such compositions by the method of the present invention. Typical analyses of water washed compositions recovered from calcium chloride brines are:

| | Percent by weight |
|---|---|
| Li | About 1.5 to 2.5. |
| Al | About 20 to 30. |
| Cl | About 14 to 18. |
| Ca | About 0.2 to 3. |
| Mg | Less than about 1. |
| Na | Less than about 1. | remainder consisting essentially of oxygen, hydroxyl groups and water as well as trace amounts of impurities, including Br, K, Sr and Fe.

In carrying out the method of the present invention a chloride containing lithium aluminate complex composition such as, for example, one obtained from a calcium chloride brine similar to those described directly hereinbefore, is contacted in a suitable reactor with water vapor at an elevated temperature, e.g. from about 250° C. to about 1000° C., sufficient to hydrolyze the chloride to gaseous hydrogen chloride thereby separating the chloride from the chloride depleted composition. This water vapor can come from water admixed with the lithium aluminate complex and/or water in the atmosphere surrounding the composition. In a preferred embodiment, a gas stream containing water vapor is passed through a reaction zone containing said complex composition in a manner as to assure intimate contact between said gas stream and said composition, e.g. by fluidized bed techniques, and to remove hydrogen chloride from the reaction zone as they are formed. The passage of the water vapor containing gas stream through said reaction zone is continued until the gas stream leaving the reaction zone is substantially free of hydrogen chloride, thus indicating that hydrolysis is substantially complete.

One advantage of the present method is that it can be carried out employing either lithium aluminate complex compositions as recovered from aqueous solutions such as calcium chloride brines which usually contain from about 60 to about 80 percent by weight water, or lithium aluminate complex compositions from which substantially all of the water has been removed.

In a more preferred embodiment a chloride containing lithium aluminate complex composition is admixed with a relatively small amount of silica and the resultant mixture contacted with water vapor for a sufficient period of time to achieve substantially complete removal of chloride values. The presence of silica in the reaction mixture promotes more complete removal of halogens from the complex compositions. Thus, the use of silica permits reducing the chloride content of lithium aluminate complex compositions to substantially lower concentrations than those concentrations attainable without the use of silica under similar reaction conditions. The quantity of silica employed is not critical. Some benefit is obtained upon the addition of even a small amount of silica. Preferably, however, it is present in the reaction mixture on a weight basis in an amount at least about equal to the amount of lithium present in the complex composition admixed with it. Ordinarily from about 5 to about 20 times this minimum quantity of silica is used. The upper limit of silica used is not critical and is determined ordinarily by the end use requirements for the substantially chloride-free complex compositions. The particle size of the silica is not critical, but 120 to 200 mesh (U.S. Sieve Series) material is conveniently used to achieve intimate admixture with the lithium aluminate complex composition.

The concentration of water vapor in the incoming reactant gas stream is not critical and can normally vary within a range of from about 1 to 100 percent by weight. Mixtures of water vapor and various gases, including, for example, air, nitrogen or flue gases, can be employed so long as the gaseous mixture does not detrimentally affect the reactor and does not contain substances which adversely affect the hydrolysis reaction rate or contaminate the lithium aluminate composition with undesirable impurities. An incoming gas stream of air containing from about 30 to about 70 percent by weight water vapor is conveniently employed. The hydrolysis reaction rate is generally directly proportional to the water vapor concentration in the reaction mixture.

The temperature at which the hydrolysis is usually carried out varies from about 250° C. to about 1000° C. Lower temperatures result in undesirably low hydrolysis rates and uneconomical operation, for example, unnecessarily long reactor retention times. Higher temperatures can be employed but are unnecessary to achieve satisfactory reaction rates and would probably require the use of more expensive reactors and otherwise result in more costly operation. Temperatures within the range of 400–800° C. are preferred. However, any elevated temperature which is sufficient to cause hydrolysis of the chloride impurity can be employed.

The time required for the hydrolysis to reach or approach completion, as will be well understood by one skilled in the art, will vary widely depending upon the conditions employed including, for example, the reaction temperature, the water vapor concentration in the reaction mixture, the efficiency of the mixing of the gas phase and solid particles in the reaction zone, the chloride content of the lithium aluminate complex composition, and the nature of the chloride compounds contained in the complex composition. Ordinarily, with complex compositions recovered from chloride brines and containing from about 1.5 to about 2.5 percent by weight Li, from about 20 to about 30 percent by weight Al, and from about 14 to about 18 percent by weight Cl, the hydrolysis reaction is substantially complete in about 1 hour at a temperature within the range of from 600–800° C. when employing a gas phase containing about 50 percent by weight water vapor, and in about 4 hours at a temperature within the range of from 400–600° C. employing similar conditions.

The mehod can be carried out in either a batchwise or a continuous manner, as will be well understood by one skilled in the art, depending on the type of reactor employed. Continuous operation is preferred.

The desired reaction temperature within the reaction zone of the reactor can be maintained by any of a number of conventional means, as will also be well understood, such as, for example, by the use of electrical resistance radiant heaters. The gas stream can be preheated prior to entering the reaction zone by various means including, for example, by utilizing a heat exchanger to which heat is supplied by the effluent gas stream.

The method is most conveniently carried out at atmospheric pressure. However, pressure is not critical and the method can be satisfactorily carried out at presurses either above or below atmospheric pressure.

Since a primary use for the substantially halide-free purified lithium aluminate compositions prepared by the method of the present invention is in the manufacture of glass and high strength ceramics and since a very low chloride level is required for such uses, the use of silica, as has been described hereinbefore, is the preferred embodiment of the present method for producing purified lithium aluminate compositions for these uses. Additionally, the presence of relatively small amounts of silica, aluminum silicates and the like in the chloride-free compositions prepared utilizing this preferred embodiment is not objectionable but can even serve a useful purpose in glass manufacture.

The following examples further illustrate the invention but are in no way meant to limit it thereto.

Example 1

A sample of a lithium aluminate complex composition recovered from an equeous chloride brine and weighing about 10 grams which contained about 29% Al, 2.2% Li, 14% Cl, 0.13% Mg, 1.9% Ca, less than 1% Na, and less than 0.1% Fe (all percentages by weight), substantially all of the remainder consisting of water and hydroxyl groups, was placed on a fritted Vycor glass support mounted within and at a substantial distance above the bottom of a vertically positioned cylindrical Vycor glass reactor about 1.5 in. in diameter and about 15 in. in height having a ⅜ in. bottom gas inlet and a ⅜ in. top gas outlet. A plug of glass wool was provided within the Vycor tube adjacent the top outlet thereby to prevent loss of solid particles from the reactor by entrainment in the effluent gas stream. The reactor was jacketed with an electrical resistance type heater and means were provided for controlling the temperature within the reactor. A gaseous mixture of nitrogen and water vapor containing about 65% by weight $H_2O$ was introduced into the bottom inlet of the reactor at a rate of about 1.5 liter/min. and the temperature of the sample and of the gaseous mixture contacting the sample as it passed through the reactor was raised to about 800° C. over a two-hour period, and then maintained at about 800° C. for an additional ½ hour period. The flow of said gaseous mixture of nitrogen and water vapor into the reactor was maintained at a constant rate of about 1.5 liter/min. during the 2½-hour heating period. The effluent gas mixture leaving the reactor through the top outlet was passed through a solution of sodium hydroxide (NaOH) of known concentration to absorb the hydrogen chloride (HCl) formed in the hydrolysis reaction. The NaOH solution was titrated periodically and the run was terminated by stopping the gas flow and cooling the reactor to room temperature when the outlet gas stream was thus determined to be substantially free of HCl. The sample was removed from the reactor and analyzed to contain only about 0.55 percent by weight chloride.

X-ray diffraction analysis of the purified lithium aluminate composition showed the presence of the crystalline structures $LiAlO_2$ and $LiAl_5O_8$. X-ray diffraction analysis of the initial lithium aluminate complex composition employed which contained about 14% by weight chlorine showed no known structures.

Example 2

About 10 grams of the initial lithium aluminate composition used in Example 1 was admixed with about 5 grams of 200 mesh silica and the resultant mixture placed in the reactor employed in Example 1. In this run, the same conditions were employed as in Example 1, except that the gaseous mixture of nitrogen and water vapor contained about 58% by weight $H_2O$. The purified lithium aluminate was analyzed to contain only about 0.07 percent by weight chloride.

X-ray diffraction analysis of the purified lithium aluminate composition showed the presence of the crystalline structure $LiAlO_2$ and $LiAl_5O_8$. X-ray diffraction analysis of the initial lithium aluminate complex composition showed no known structures.

Comparison of the results obtained in the above Examples illustrates the beneficial effect of silica in that a purified lithium aluminate composition having a significantly lower chloride content was obtained when silica was admixed with the sample.

Various modifications can be made in the present invention without departing from the spirit or scope thereof for it is understood that we limit ourselves only as defined in the appended claims.

We claim:
1. A method for removing halides from a lithium aluminate complex composition which comprises:
 (a) admixing a chloride containing lithium aluminate complex composition with silica to form a silica-composition mixture; and
 (b) contacting the mixture with water vapor at an elevated temperature sufficient to hydrolyze the chloride values associated with said composition to gaseous hydrogen chloride thereby removing said chloride from the resultant reaction mass and obtaining a purified lithium aluminate composition.

References Cited

UNITED STATES PATENTS 2,347,736   5/1944   Fisher _____ 23—52

HERBERT T. CARTER, Primary Examiner

U.S. Cl. X.R.

23—154, 155